(12) United States Patent
Sud et al.

(10) Patent No.: US 7,415,065 B2
(45) Date of Patent: Aug. 19, 2008

(54) ADAPTIVE FILTERING IN THE PRESENCE OF MULTIPATH

(75) Inventors: Seema Sud, Reston, VA (US); Wilbur Myrick, South Riding, VA (US)

(73) Assignee: Science Applications International Corporation, San Diego, CA (US)

( * ) Notice: Subject to any disclaimer, the term of this patent is extended or adjusted under 35 U.S.C. 154(b) by 661 days.

(21) Appl. No.: 10/689,765

(22) Filed: Oct. 22, 2003

(65) Prior Publication Data

US 2004/0151266 A1 Aug. 5, 2004

Related U.S. Application Data

(60) Provisional application No. 60/421,101, filed on Oct. 25, 2002.

(51) Int. Cl.
*H03H 7/40* (2006.01)
(52) U.S. Cl. .................. 375/230; 375/232; 375/350; 708/300; 708/322; 455/307
(58) Field of Classification Search .................. 375/350, 375/316, 341, 346, 229, 230, 232; 708/300, 708/304, 322, 323; 455/307
See application file for complete search history.

(56) References Cited

U.S. PATENT DOCUMENTS

| | | | |
|---|---|---|---|
| 3,876,947 A | 4/1975 | Giraudon | 455/253.2 |
| 3,892,051 A | 7/1975 | Bunker | 35/12 N |
| 4,173,759 A | 11/1979 | Bakhru | 342/382 |
| 4,259,661 A | 3/1981 | Todd | 340/146.3 AQ |
| 4,353,119 A | 10/1982 | Daniel et al. | 702/194 |
| 4,513,383 A | 4/1985 | Hackett, Jr. | 702/190 |
| 4,628,320 A | 12/1986 | Downie | 342/16 |
| 4,649,505 A | 3/1987 | Zinser, Jr. et al. | 379/406.08 |
| 4,719,466 A | 1/1988 | Farina et al. | 342/159 |
| 4,797,807 A | 1/1989 | Gerlach | 708/310 |
| H792 H | 6/1990 | Sanval et al. | 342/17 |
| 4,959,653 A | 9/1990 | Ganz | 342/17 |
| H1005 H | 12/1991 | Gerlach | 342/378 |
| H1033 H | 3/1992 | Willey et al. | 342/17 |
| 5,142,551 A * | 8/1992 | Borth et al. | 375/219 |
| 5,151,919 A | 9/1992 | Dent | 370/209 |
| 5,265,065 A | 11/1993 | Turtle | 707/4 |
| 5,267,266 A | 11/1993 | Chen | 375/232 |
| 5,285,291 A | 2/1994 | Schiller | 358/453 |
| 5,390,364 A | 2/1995 | Webster et al. | 455/506 |
| 5,511,423 A | 4/1996 | Sugiyama et al. | 73/602 |
| 5,517,122 A | 5/1996 | Chen | 324/322 |
| 5,541,520 A | 7/1996 | Zai et al. | 324/618 |

(Continued)

OTHER PUBLICATIONS

Ricks and Goldstein, "Efficient Architectures for Implementing Adaptive Algorithms," *Proceedings of the 2000 Antenna Applications Symposium*, Allerton Park, Monticello, Illinois, pp. 29-41, Sep. 20-22, 2000.

(Continued)

*Primary Examiner*—Dac V Ha
(74) *Attorney, Agent, or Firm*—King & Spalding LLP

(57) ABSTRACT

Adaptively analyzing an observed signal to estimate that part of the signal that best corresponds to a steering vector. Modifying the steering vector by convolution of the steering vector with a vector estimating the effect of multipath on the observed signal.

12 Claims, 5 Drawing Sheets

U.S. PATENT DOCUMENTS

Figure 1:
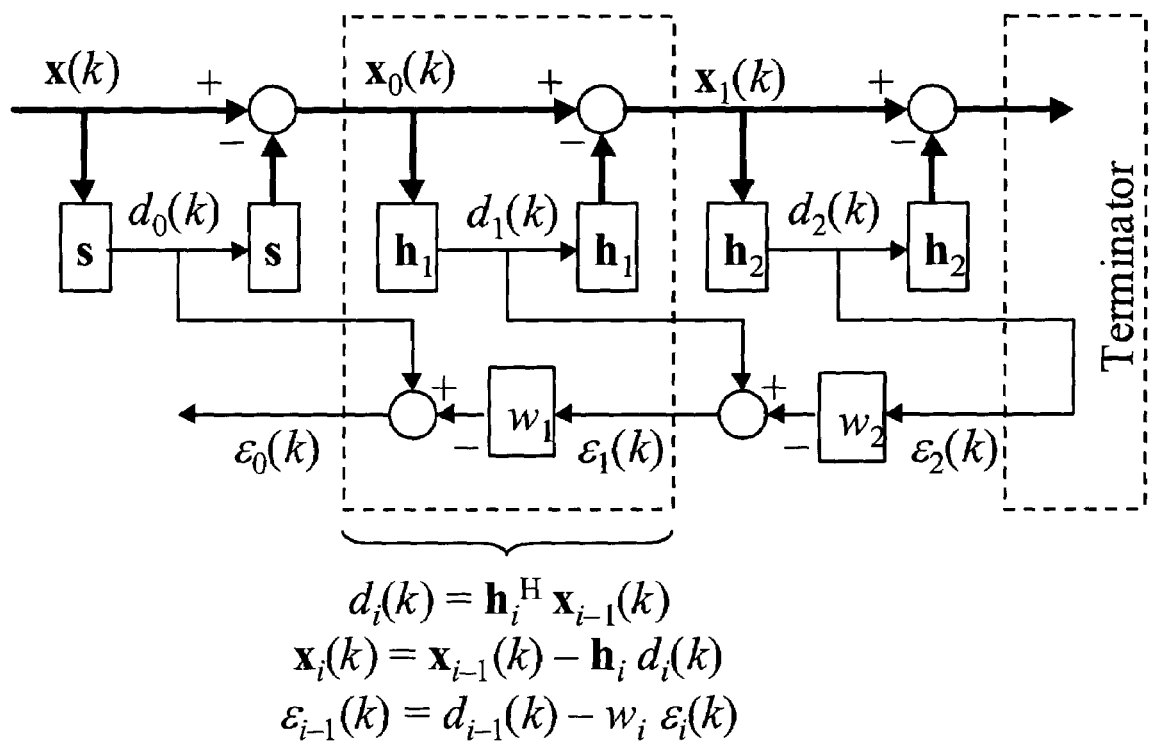

| | | | |
|---|---|---|---|
| 5,541,867 A | 7/1996 | Corry et al. | 708/322 |
| 5,586,066 A | 12/1996 | White et al. | 702/181 |
| 5,640,429 A | 6/1997 | Michels et al. | 375/340 |
| 5,673,210 A | 9/1997 | Etter | 702/69 |
| 5,694,342 A | 12/1997 | Stein | 702/190 |
| 5,694,592 A | 12/1997 | Driscoll | 707/3 |
| 5,696,962 A | 12/1997 | Kupiec | 707/4 |
| 5,706,013 A | 1/1998 | Melvin et al. | 342/159 |
| 5,708,754 A | 1/1998 | Wynn | 704/219 |
| 5,760,734 A | 6/1998 | Urkowitz | 342/159 |
| 5,774,839 A | 6/1998 | Shlomot | 704/222 |
| 5,790,588 A * | 8/1998 | Fukawa et al. | 375/148 |
| 5,963,888 A | 10/1999 | Uhlmann et al. | 702/109 |
| 5,963,940 A | 10/1999 | Liddy et al. | 707/5 |
| 6,032,113 A | 2/2000 | Graupe | 704/201 |
| 6,041,291 A | 3/2000 | Yamazaki et al. | 702/191 |
| 6,044,336 A | 3/2000 | Marmarelis et al. | 702/190 |
| 6,058,408 A | 5/2000 | Fischer et al. | 708/322 |
| 6,121,914 A | 9/2000 | Cavelos et al. | 342/16 |
| 6,122,628 A | 9/2000 | Castelli et al. | 707/5 |
| 6,124,828 A | 9/2000 | Champeau | 342/379 |
| 6,130,641 A | 10/2000 | Kraeutner et al. | 342/179 |
| 6,144,937 A | 11/2000 | Ali | 704/233 |
| 6,157,403 A | 12/2000 | Nagata | 348/171 |
| 6,188,352 B1 | 2/2001 | Choi et al. | 342/378 |
| 6,201,954 B1 | 3/2001 | Soliman | 455/226.2 |
| 6,219,561 B1 | 4/2001 | Raleigh | 455/561 |
| 6,236,862 B1 | 5/2001 | Erten et al. | 455/501 |
| 6,239,746 B1 | 5/2001 | Pipon et al. | 342/440 |
| 6,258,494 B1 | 7/2001 | Bourdelais et al. | 430/15 |
| 6,263,307 B1 | 7/2001 | Arslan et al. | 704/226 |
| 6,278,961 B1 | 8/2001 | Kadtke et al. | 702/189 |
| 6,289,046 B1 | 9/2001 | Takeuchi et al. | 375/232 |
| 6,295,520 B1 | 9/2001 | Tian | 704/223 |
| 6,341,298 B1 | 1/2002 | Ilani | 708/520 |
| 6,697,633 B1 * | 2/2004 | Dogan et al. | 455/509 |
| 6,904,444 B2 | 6/2005 | Picciolo et al. | 708/322 |
| 7,103,537 B2 | 9/2006 | Witzgall et al. | 704/219 |
| 7,120,657 B2 | 10/2006 | Ricks et al. | 708/322 |
| 7,167,884 B2 | 1/2007 | Picciolo et al. | 708/322 |
| 2004/0098299 A1 * | 5/2004 | Ligon et al. | 705/10 |

OTHER PUBLICATIONS

Goldstein, J. Scott, et al., "A Multistage Representation of the Wiener Filter Based on Orthogonal Projections," *IEEE Transactions on Information Theory*, vol. 44, No. 7, pp. 2943-2959, Nov. 1998.

Goldstein, J. Scott, et al, "A Reduced Rank MMSE Receiver for a DS-CDMA System in Frequency Selective Multi-Path," *IEEE Military Communications Conference*, pp. 1109-1113, Oct. 28-31, 2001.

Goldstein, J. Scott, et al, "MMSE Correlator Based Rake Receiver for DS-CDMA," *IEEE Military Communications Conference*, pp. 1418-1422, Oct. 28-31, 2001.

Guerci, et al., "Principal Components, Covariance Matrix Tapers, and the Subspace Leakage Problem," *IEEE Trans. Aerosp. Electron. Syst.*, vol. 38, No. 1, Jan. 2002, pp. 152-162.

Antonik, et al., "Implementation of Knowledge-Based Control for Space-Time Adaptive Processing," *IEEE Radar 97Conference*, Oct. 14-16, 1997, pp. 478-482.

Reed, et al., "Rapid Convergence Rate in Adaptive Arrays," *IEEE Trans. Aerosp. Electron. Syst.*, vol. AES-10, No. 6, Nov. 1974, pp. 853-863.

Guerci, et al., "Optimal and Adaptive Reduced-Rank STAP," *IEEE Transactions on Aerospace and Electronic Systems*, vol. 36, No. 2, pp. 647-663, Apr. 2000.

Ding, "A Similarity-Based Probability Model for Latent Semantic Indexing," *Proceedings of the 22nd Annual SIGIR Conference*, Berkeley, CA, Aug. 1999.

Drumais, "Automotive Cross-Linguistic Information Retrieval Using Latent Semantic Indexing," *SIGIR '96—Workshop on Cross-Linguistic Information Retrieval*, Aug. 16-23, 1996.

Dumais, "Latent Semantic Indexing (LSI): TREC-3 Report," D. Hartman (Ed.), *The Third Text Retrieval Conference (TREC3), National Institute of Standards and Technology Special Publication*, 12 pp., 1995.

Dumais, "Latent Semantic Indexing (LSI) and TREC-2," Harman (Ed.), *The Second Text Retrieval Conference (TREC2), National Institute of Standards and Technology Special Publication* 500-215, 1994, pp. 105-116.

Dumais, LSI Meets TREC: A Status Report, In D. Harman (Ed.), *The First Text Retrieval Conference (TREC1), National Institute of Standards and Technology Special Publication* 500-207, 1993, pp. 137-152.

Deerwester, et al., "Indexing by Latent Semantic Analysis," *J. Soc. For Information Science*, 41(6), pp. 391-407, Oct. 1990.

Gerlach, K., Kretschmer, F. F., Jr., "Convergence Properties of Gram-Schmidt and SMI Adaptive Algorithms," *IEEE Trans. Aerospace and Electronics Systems*, vol. 26, No. 1, Jan. 1990, pp. 44-56.

Picciolo, M. L., Gerlach, K., "Median Cascaded Canceller Using Reiterative Processing," *Proceedings of IEEE Radar Conference*, Huntsville, AL, May 5-8, 2003, pp. 71-78.

Picciolo, M., Gerlach, K., "Median Cascaded Canceller Using Reiterative Processing," *IEEE 2003 Radar Conference*, Presentation, 25 pp., 2003.

Picciolo, M. L., Schoenig, G. N., Mili, L., Gerlach, K., "Rank-Independent Convergence For Generic Robust Adaptive Cascaded Cancellers Via Reiterative Processing," *Proceedings of International IEEE Radar Conference*, Washington, DC, May 9-12, 2005, pp. 399-404.

Picciolo, M. L., "Robust Adaptive Signal Processors," Ph.D. Dissertation, Virginia Polytechnic Institute and State University, Apr. 18, 2003, 220 pp.

Picciolo, M. L., Gerlach, K., "Median Cascaded Canceller for Robust Adaptive Array Processing," *IEEE Transactions on Aerospace and Electronic Systems*, vol. 39, Issue 3, Jul. 2003, pp. 883-900.

Haykin, S., "Adaptive Filter Theory," 3rd Edition, Prentice Hall, New Jersey, 1996 (Copy of Cover, Copyright Page, Table of Contents, Chapters 5 and 14).

Goldstein, J. S., Reed, I. S., Zulch, P. A., "Multistage Partially Adaptive STAP CFAR Detection Algorithm," *IEEE Trans. Aerospace and Elect. Syst.*, vol. 35, No. 2, Apr. 1999, pp. 645-662.

Haykin, S., "Signal Processing: Where Physics and Mathematics Meet," *IEEE Signal Proc. Magazine*, Jul. 2001, pp. 6-7.

Jeng-Kuang, et al., An Efficient Algorithm and Pipelined VLSI Architecture for the Maximum Likelihood Estimation of Directions of Arrival, *IEEE International Conference*, pp. 2919-2922, 1990.

Knockaert, "A Recursive Algorithm for Linear System Identification," *IEEE Trans.*, vol. 34, Issue 3, pp. 492-498, Jun. 1986.

Schneider, et al., "A Krylov Subspace Method for Large Estimation Problems," *IEE International Conference*, vol. 3, pp. 1701-1704, Mar. 1999.

Camps, et al., "Radiometric Sensitivity Computation in Aperture Synthesis Interferometric Radiometry," *IEEE Trans.*, vol. 36, pp. 680-685,.

J. Scott Goldstein, J. R. Guerci,, and I. S. Reed, "Reduced-Rank Intelligent Signal Processing With Application to Radar, Intelligent Signal Processing," *IEEE Press*, New York, p. 465. 2001.

Preliminary Examination Report for Application No. PCT/US01/42582, dated May 28, 2002 (mailing date).

International Search Report for Application No. PCT/US01/26592, dated Nov. 26, 2001 (mailing date).

S. Haykin, Adaptive Filter Theory, 3rd edition, esp. pp. 194, 483, Prentice Hall, 1996.

Bernard Widrow and Samuel Stearns, Adaptive Signal Processing, Prentice Hall, 1985.

G. H. Golub and C. F. Van Loan, Matrix Computations, 3rd edition, Johns Hopkins University Press,(esp. pp. 18-19), with examples tabulated on pp. 254, 263, and 270, 1996.

Harold Abelson and Gerald Sussman, Structure and Interpretation of Computer Programs, MIT Press and McGraw Hill, pp. 39-40.

International Preliminary Examination Report for Application No. PCT/US01/26592, dated Jun. 14, 2002 (mailing date).

Preliminary Amendment for U.S. Appl. No. 09/933,004, filed Sep. 13, 2002.

Non-Final Office Action for U.S. Appl. No. 09/933,004 mailed Jul. 30, 2004.
Response to Non-Final Office Action mailed Jul. 30, 2004 for U.S. Appl. No. 09/933,004 filed Nov. 30, 2004.
Final Office Action for U.S. Appl. No. 09/933,004 mailed Jun. 27, 2005.
Request for Reconsideration in Response to Final Office Action mailed Jun. 27, 2005 for U.S. Appl. No. 09/933,004 filed Aug. 25, 2005.
Notice of Allowance for U.S. Appl. No. 09/933,004 mailed Oct. 25, 2005.
Request for Continued Examination with Information Disclosure Statement in Response to Notice of Allowance mailed Oct. 25, 2005 for U.S. Appl. No. 09/933,004 filed Jan. 25, 2006.
Notice of Allowance for U.S. Appl. No. 09/933,004 mailed May 24, 2006.
Notice to File Corrected Application Papers for U.S. Appl. No. 11/508,833, mailed Sep. 12, 2006.
Response to Notice to File Corrected Application Papers mailed Sep. 12, 2006 for U.S. Appl. No. 11/508,833 filed Oct. 2, 2006.
Non-Final Office Action for U.S. Appl. No. 11/508,833 mailed Jul. 16, 2007.
Response to Non-Final Office Action mailed Jul. 16, 2007 for U.S. Appl. No. 11/508,833 filed Nov. 13, 2007.
Non-Final Office Action for U.S. Appl. No. 09/974,091 mailed Feb. 16, 2005.
Reply Under 37 C.F.R. 1.111 - Request for Reconsideration in Response to Non-Final Office Action mailed Feb. 16, 2005 for U.S. Appl. No. 09/974,091 filed May 13, 2005.
Final Office Action for U.S. Appl. No. 09/974,091 mailed Jul. 18, 2005.
Request for Reconsideration in Response to Final Office Action mailed Jul. 18, 2005 for U.S. Appl. No. 09/974,091 filed Aug. 18, 2005.
Examiner Interview Summary for U.S. Appl. No. 09/974,091 mailed Sep. 14, 2005.
Non-Final Office Action for U.S. Appl. No. 09/974,091 mailed Oct. 4, 2005.
Request for Reconsideration in Response to Non-Final Office Action mailed Oct. 4, 2005 for U.S. Appl. No. 09/974,091 filed Feb. 6, 2006.
Notice of Allowance for U.S. Appl. No. 09/974,091 mailed Apr. 18, 2006.
Non-Final Office Action for U.S. Appl. No. 11/496,419 mailed Dec. 6, 2007.

* cited by examiner

ADAPTIVE FILTERING IN THE PRESENCE OF MULTIPATH

CROSS REFERENCE TO RELATED APPLICATIONS

The present application relates to and claims priority to applicant's co-pending provisional patent application 60/421,101 entitled: Method and System for Reduced Rank Adaptive Filtering, filed Oct. 25, 2002 which is incorporated herein in its entirety by reference.

The present application is related to pending utility patent application Ser. No. 09/933,004 entitled System and Method for Adaptive Filtering, filed Aug. 21, 2001, which is incorporated herein in its entirety by reference.

BACKGROUND

Code Division Multiple Access (CDMA) is a method for multiple users to share common bandwidth over a communications channel. Instead of dividing the frequency spectrum of the channel into discrete sub-channels (frequency division multiplexing—FDM) or alternating use of a channel over time (time division multiplexing—TDM), CDMA mixes each user's transmission with a spreading code, typically a pseudo-random sequence having a starting point and a progression known by both the transmitter and the receiver. In this fashion, many users can share the same bandwidth at the same time. CDMA is one of methods specified for use in third-generation (3G) mobile communications by the International Telecommunication Union,(see, e.g., "The CDMA 2000 Candidate Submission", Telecommunications Industry Association TIA TR-45.5 Subcommittee, June 1998). However, systems employing CDMA are typically interference-limited. The interference can arise from the very nature of the systems in which CDMA is used, e.g., cellular telephone, in which it is typically desirable to accommodate multiple users transmitting simultaneously through a common physical channel.

In telecommunications, "multipath" is a propagation phenomenon wherein a signal reaches a receiver by two or more paths. Causes of multipath include atmospheric ducting, ionospheric reflection and refraction, and reflection from objects such as mountains and buildings. The effects of multipath include constructive and destructive interference, and phase shifting of the signal. Interference between signals, e.g., multiple access interference (MAI) can also arise from multiple users sharing a common bandwidth for different services, such as voice and data transmission. Data rate mismatches between users can result in code mismatch. Even in the absence of multipath, this can cause MAI.

Not surprisingly, since CDMA is currently-specified as a multiple-access scheme for 3G cellular telephone systems and methods mitigating the effects of multipath and providing MAI suppression in CDMA environments are highly desirable. Those systems and methods that are less computation-intensive than others are more desirable.

Typically, a multiple-delay-line filter, called a "rake," is used to coherently combine multipath signals at the receiver. The phase and gain information used to cohere a rake filter typically is provided by a separate equalization function. Rake receivers, while designed to operate in multipath environments, are generally limited in performance by MAI. MAI causes the performance of a conventional rake receiver to degrade rapidly as the number of users are increased in a CDMA system. On the other hand, research in interference (e.g., MAI) suppression has typically focused on data-aided or blind Minimum Mean Square Error (MMSE) receivers, which are sub-optimal in multipath channels.

SUMMARY

DETAILED DESCRIPTION

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention. This disclosure, while illustrative of preferred embodiments of the invention, describes the invention with respect to Direct Sequence (DS)-CDMA. Preferred embodiments of the invention are also applicable to other modulation types, such as Time Division Multiple Access (TDMA) and Frequency Division Multiple Access (FDMA), as will be apparent to those skilled in the art. Similarly, although binary signaling is used to illustrated enabling embodiments, embodiments of the invention apply to MAI reduction and multipath mitigation generally.

In a Direct Sequence (DS)-CDMA system having K users, user k transmits a baseband signal that can be expressed as:

$$x_k(t) = \sum_i A_k b_k(i) s_k(t - iT - \tau_k), \tag{1}$$

where:

$b_k(i)$ is the symbol transmitted by user k at i, $b_k(i) \in (-1, +1)$, i.e., binary signaling;

$S_k(t)$ is the spreading associated with user k;

$A_k$ is the signal amplitude; and $\tau_k$ is the delay associated with user k.

The spreading sequence can be written as:

$$s_k(t) = \sum_{i=1}^{N-1} a_k[i] \Psi(t - iT_c) \tag{2}$$

where:

$$a_k[i] \in \left( \frac{+1}{\sqrt{N}}, \frac{-1}{\sqrt{N}} \right)$$

is a normalization factor for the spreading code;

$$N = \frac{T}{T_c}$$

is the processing gain of the CDMA system, or equivalently the bandwidth spreading factor, where T is the symbol period and $T_c$ is the chip period; and $\Psi(t)$ represents the chip sequence.

For the illustrative embodiments described herein, the spreading code is a square wave sequence with no pulse shaping, therefore the chip sequence is a constant. Assume also, without loss of generality, that user 1 is of interest, and that the receiver has timing information to synchronize to the spreading code of the desired user.

The noiseless distortionless aggregate transmitted signal $\bar{y}(i)$ can be defined as the N-vector composed of asynchronous combination of the data for each user multiplied with its respective spreading sequence. Due to asynchronous transmission, as is inherent to the reverse link of a cellular telephone system, both the current bit of user k, denoted $b_k(i)$, and the previous bit of user k, denoted $b_k(i-1)$ multiplied with their respective portions of the spreading code, are interfering with the current bit of user 1. The noiseless distortionless aggregate transmitted signal can then be written as:

$$\bar{y}(i) = b_1(i)\bar{s}_1 + \sum_{k=2}^{K} A_k [b_k(i)\bar{s}_k^+ + b_k(i-1)\bar{s}_k^-]. \quad (3)$$

Here, $\bar{s}_1$ is the spreading sequence of User 1;

$\bar{s}_k^+, \bar{s}_k^-$ are the N×(K−1) matrices of spreading codes associated with the K−1 interfering users.

Consider the case where the channel is an additive white Gaussian noise (AWGN) channel, so that the distortionless received signal $\bar{r}(i)$ is an N-vector comprising samples at the output of a chip-matched filter at each symbol i, represented by:

$$\bar{r}(i) = \bar{y}(i) + \bar{n}(i) \quad (4)$$

Substituting Equation (3) for y(i), Equation (4) can be written as:

$$\bar{r}(i) = b_1(i)\bar{s}_1 + \sum_{k=2}^{K} A_k [b_k(i)\bar{s}_k^+ + b_k(i-1)\bar{s}_k^-] + \bar{n}(i) \quad (5)$$

It is desirable to extract user 1's baseband signal, $b_1(i)$, while suppressing the interference represented by the summation of Equation (3). Ideally, one would subtract out the interference terms and then despread by user 1's spreading code, $\bar{s}_1$, to extract $b_1$ from the received signal. In practice, this is difficult because the interference is unknown and embedded in the received signal, and the channel will further distort the transmitted signal, e.g., through the effects of frequency-dependent multipath.

For an MMSE receiver, receive filter coefficients (denoted by $\bar{c}$) are chosen to minimize the mean-square error (MSE) between the transmitted bit $b_1(i)$ and its estimate. This can be expressed as:

$$MSE = E[|b_1(i) - \bar{c}^H \bar{r}(i)|^2] \quad (6)$$

where:

$E[\bullet]$ denotes the expected value operator;

$(\bullet)^H$ represents the Hermitian transpose operator; and $\bar{r}(i)$ represents the sample received signal from Equation (5).

Solving Equation (6) for $\bar{c}$ yields:

$$\bar{c}_{MMSE} = \bar{R}^{-1} \bar{s}_1 \quad (7)$$

where $\bar{R}$ is the covariance matrix given by $\bar{R} = E[\bar{r}(i)\bar{r}(i)^H]$.

Note that computation of the MMSE solution for $\bar{c}$ calls for the inversion of the N×N covariance matrix $\bar{R}$, which can be computationally intense and may not be practical to complete in real time for a high data rate system. Also, if the channel or signals are changing in time, then the sample covariance matrix estimated from the data does not depict the true non-stationary signal environment. Thus, it is desirable to find alternate solutions that approach, or exceed, the performance of the MMSE receiver but that require less processing resources and can adapt rapidly.

The reduced rank Multistage Wiener Filter (MWF) provides performance comparable to a full-rank MMSE solution, but with much fewer computations and with better performance under lower sample support conditions. An MWF filter achieves a convergence speed-up better than achieved with Principal Components (PC) and reduced computational burden relative to PC. This is done by exploiting information contained in both $\bar{R}_1$ and the steering vector $\bar{s}$ in choosing the reduced dimension subspace that $\bar{s}$ is constrained to lie within. In contrast, PC only makes use of the information contained in $\bar{R}_1$. In MWF, there is no computation of eigenvectors. It has been shown that the MWF implicitly constrains the desired weight vector to lie in the Krylov subspace spanned by $\{\delta_{NM}, K\delta_{NM}, \ldots, K^{D-1}\delta_{NM}\}$. MWF is more effective in low sample support environments than other adaptive algorithms. FIG. 1 illustrates an MWF with two stages.

The MWF can be based on a correlation-subtraction architecture as described in "Efficient Architectures for Implementing Adaptive Algorithms" by Ricks and Goldstein, *Proceedings of the* 2000 *Antenna Applications Symposium*, pg. 29-41. Allerton Park, Monticello, Ill., Sep. 20-22, 2000 [RICKS], hereby incorporated herein by reference.

Referring to FIG. 1, for an MWF operating in an AWGN channel, $\bar{h}_0 = \bar{s}_1$, i.e., the spreading code of the desired user. Then $\bar{d}_0(n) = \bar{s}_1^H \bar{x}(n)$, where the input signal $\bar{x}(n)$ is a vector composed of a block of M bits of the received sampled signal: $[\bar{r}(n-M+1), \bar{r}(n-M+2), \ldots, \bar{r}(n)]$. The filter in FIG. 1 demonstrates the low comple this MWF implementation and that computation of signal blocking matrices are no longer necessary for subspace partitioning such as that required for constrained adaptation.

The forward recursion equations, as presented in "A Multistage Representation of the Wiener Filter Based on Orthogonal Projections", Goldstein, Reed, and Scharf, *IEEE Transactions on Information Theory*, Volume 44, Number 7, November 1998 [GOLDSTEIN] and "Adaptive Reduced-Rank Residual Correlation Algorithms for DS-CDMA Interference Suppression" by Honig and Goldstein, *Proceedings of Asilomar*, July 1998 [HONIG 1], hereby incorporated herein by reference in its entirety, along with the initialization and backward recursion equations can be given as:

initialization:

$d_0(n)$ and $\bar{x}(n)$ as above;

forward recursion for k=1,2, . . . ,D:

$$\bar{h}_k = \frac{\sum_\Omega \{d^*_{k-1}(n)\bar{x}_{k-1}(n)\}}{\left\|\sum_\Omega \{d^*_{k-1}(n)\bar{x}_{k-1}(n)\}\right\|},$$

$d_k(n) = \bar{h}_k^H \bar{x}_{k-1}(n)$, and $\bar{x}_k(n) = \bar{x}_{k-1}(n) - \bar{h}_k d_k(n)$; and backward recursion for k=D, D−1, . . . 1 with $e_D(n) = d_D(n)$ $$w_k = \frac{\sum_\Omega \{d^*_{k-1}(n)e_k(n)\}}{\sum_\Omega \{|e_k(n)|^2\}}$$

$e_{k-1}(n) = d_{k-1}(n) - w_k^* e_k(n)$ where Ω denotes the region of sample support used to compute the sample statistics.

In typical applications, the MWF has been limited to environments not overly influenced by multipath, or environments in which multipath correction has been applied at an earlier stage. In these applications, the MWF steering vector is the spreading code of the desired CMDA transmission to be demodulated.

A channel subjected to multipath interference can be modeled in discrete time by an L-tapped delay line having delay coefficients represented by $\bar{h} = [h_1, h_2, \ldots h_L]$. The parameter L, when viewed in units of time, is known as the delay spread of the channel and is typically on the order of 5-10 microseconds. A signal received via an AWGN channel characterized with multipath in this fashion can be written as:

$$\hat{r}(i) = \hat{y}(i) + \bar{n}(i) \tag{8}$$

where $\hat{y} = \bar{y} * \bar{h}$, and * denotes convolution.

Substituting for $\bar{y}$ using Equation (3), the received signal can now be written as:

$$\hat{r}(i) = b_i(i)\hat{s}_1 + \sum_{k=2}^{K} A_k \left[ b_k(i)\hat{s}_k^+ + b_k(i-1)\hat{s}_k^- \right] + \bar{n}(i) \tag{9}$$

where (ˆ•) denotes convolution of the operand with the channel vector $\bar{h}$. Throughout this disclosure, the channel vector is known, or can be estimated in ways known to those skilled in the art.

Exploiting the analogy between Equation (5) for the AWGN channel and Equation (9) for the multipath channel, the MMSE solution in the presence of multipath can be written from the AWGN solution in Equation (7) as:

$$\hat{c}_{MMSE} = \hat{R}^{-1} \hat{s}_1 = E\left[\hat{r}\hat{r}^H\right]^{-1} \hat{s}_1 \tag{10}$$

The MWF solution can be obtained similarly, by setting $\bar{h}_0 = \hat{s}_1$. Note that the rake-only solution, which incorporates the effects of multipath and neglects the interference, e.g., MAI, can be written as: $\bar{c}_{Rake} = \hat{s}_1$.

In the presence of only AWGN, this reduces to the matched filter (MF) solution, $\bar{c}_{MF} = \bar{s}_1$. The equations above provide a way of representing the Rake, MWF, and MMSE filter coefficients when multipath is present.

Simulations of the performance of a receiver of the present invention (an multipath MWF receiver) versus a full rank MMSE receiver and a Rake-only receiver indicate that a multipath MWF receiver operating at a reduced rank performs as well as a full rank MMSE receiver and better than a Rake-only receiver.

The bit estimates can be obtained by multiplying the received signal by the receiver filter coefficients and forming a hard decision. Thus, in the case of MMSE and Rake we compute $\hat{b}_1(i) = \bar{c}_{MMSE/Rake}^H \hat{r}(i)$.

In the case of a multipath MWF receiver, the bit estimate is produced at the last stage of the filter and can be written as: $\hat{b}_1(i) = \epsilon_0(i)$.

For the Monte Carlo simulation results, unless otherwise indicated, the processing gain is N=32, and the number of users is fixed at K=15. An L=5 tap channel is used to simulate the multipath, using one tap per chip. The number of bits per block is 5000, and the number of blocks is at least 10 (chosen to produce enough errors to obtain a valid statistical bit error rate estimate). The power of the interfering users is set to 6 dB greater than that of the desired user to determine performance in a near/far situation.

Figure 2:
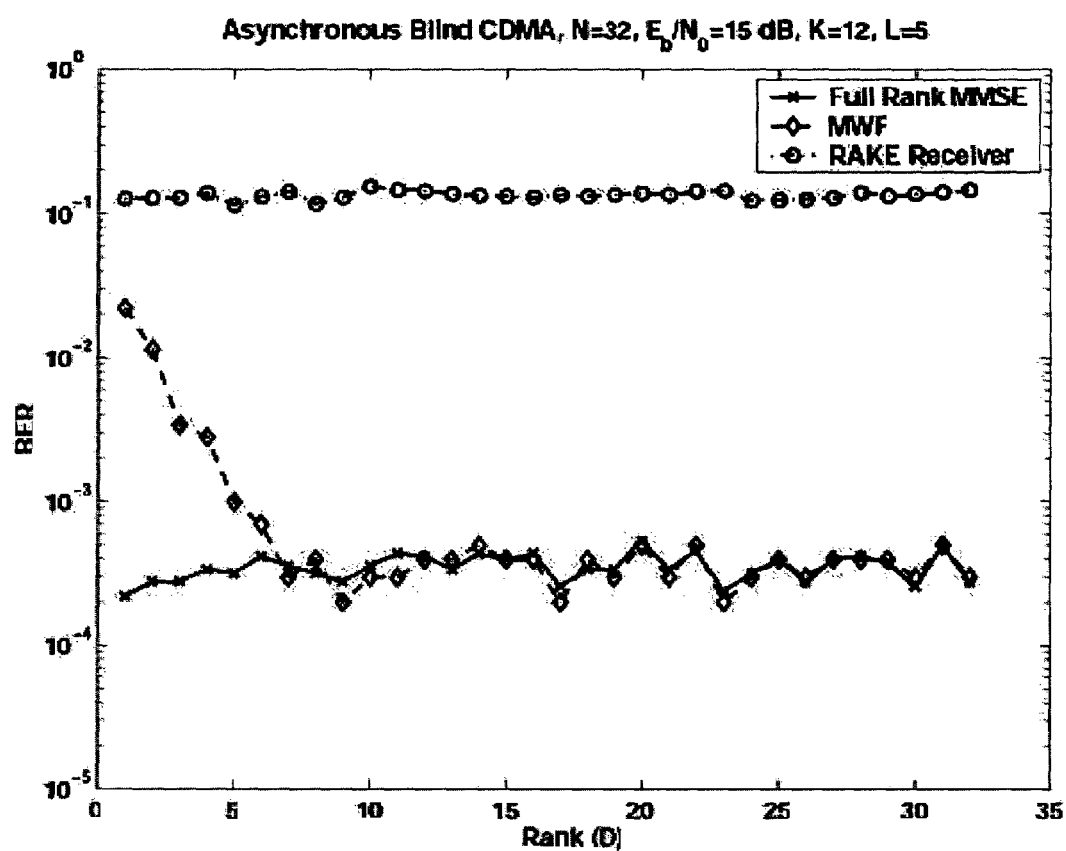

FIG. 2 is a plot of rank versus BER for each receiver type, i.e., full rank MMSE, Rake, and a multipath MWF receiver. The variation in BER for the MMSE and rake receivers is due to the nature of the simulation, since their performance is independent of rank. Note that for rank as low as seven, the simulation indicates that a multipath MWF receiver performs substantially as well as the full rank MMSE receiver and maintains this performance as rank increases. The performance of a multipath MWF receiver degrades only when the rank falls below approximately five. The performance of a multipath MWF receiver at full rank exactly matches the performance of a full-rank MMSE receiver. Both a multipath MWF receiver and an MMSE receiver consistently perform better than the rake receiver.

Figure 3:
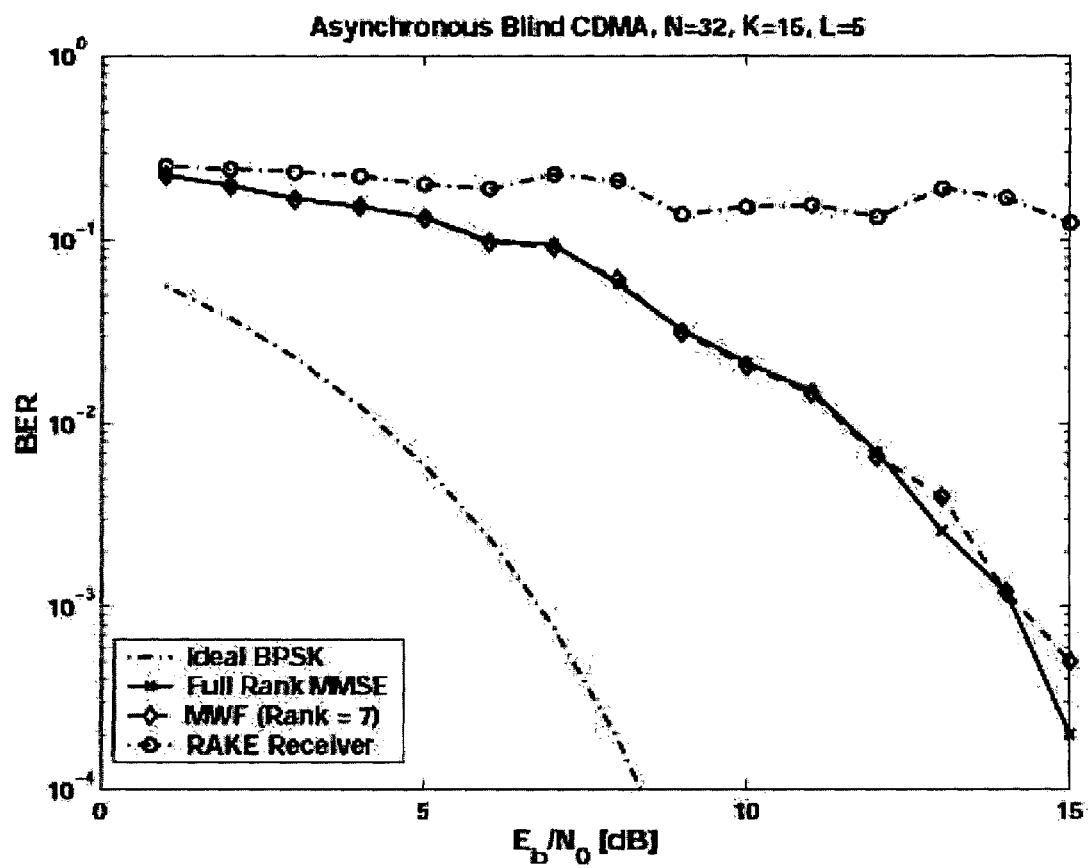

FIG. 3 is a plot of $E_b/N_0$ versus BER for each receiver type. In this case, the rank of the multipath MWF receiver is seven. The multipath MWF receiver performs as well as the MMSE receiver and significantly better than the rake receiver. Note that there is about a 6 dB degradation in performance from the ideal Bi-Phase Shift Keying (BPSK) curve. This degradation is directly related to the desired user having 6 dB less power relative to the interferers. To a lesser extent, it is also caused by the system being asynchronous and by the channel characteristics, including multipath. The performance here could be improved by using decision feedback.

Figure 4:
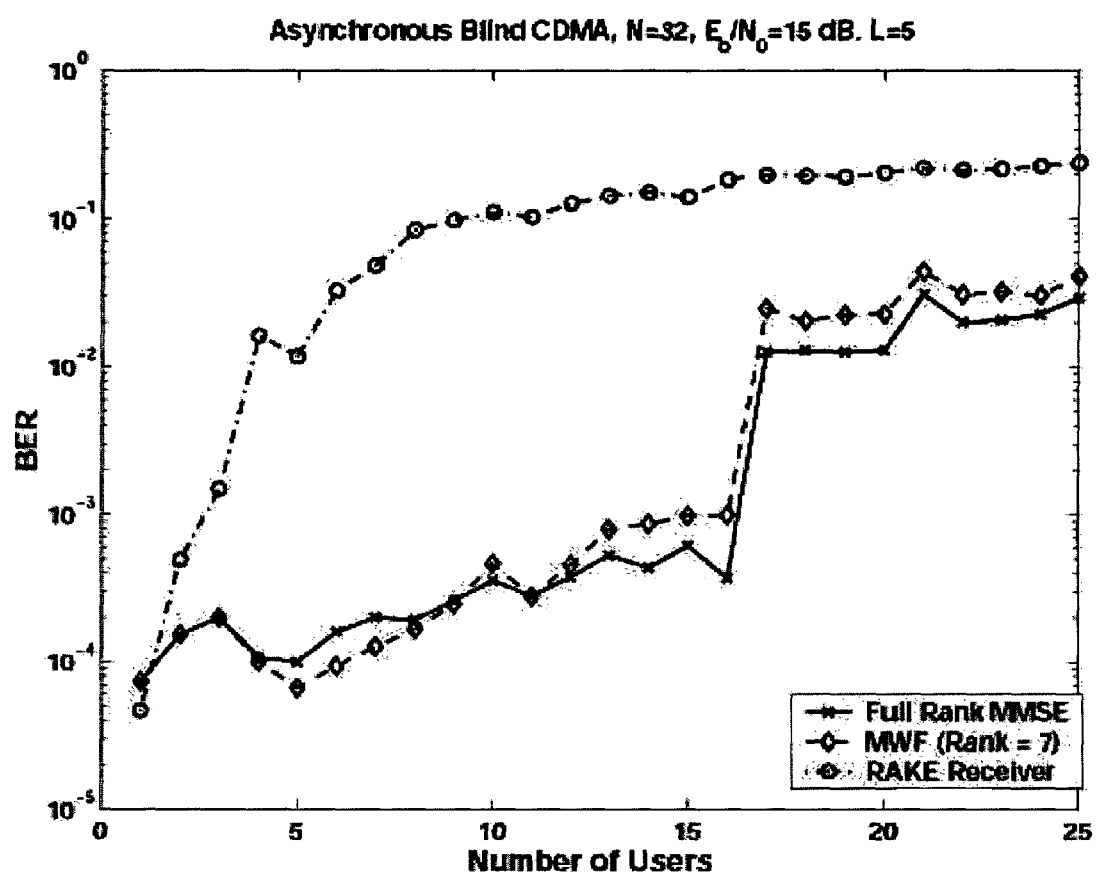

Next, FIG. 4 shows a plot of the number of users, K, versus BER for each receiver type. In that Figure, the $E_b/N_0$ is 15 dB, and the rank of the multipath MWF receiver is again seven. The number of users varies from one to twenty five. These results indicate that for a lightly loaded system, the Rake receiver performs reasonably well, but its BER degrades rapidly as the load is increased. The multipath MWF receiver substantially meets MMSE receiver performance over the entire range of loading. Note that when the number of users increases beyond half the processing gain, the performance of both MMSE and multipath MWF receivers degrades substantially. This occurs in the presence of asynchronous CDMA signals because the N+L−1 taps of both receivers span only one bit interval. A receiver with taps that spans two bit intervals is one way to address this issue. Another way is to increase the sampling rate, which is equivalent to increasing the number of taps per bit. Then, the effect of the asynchronism would have less of an impact.

Figure 5:
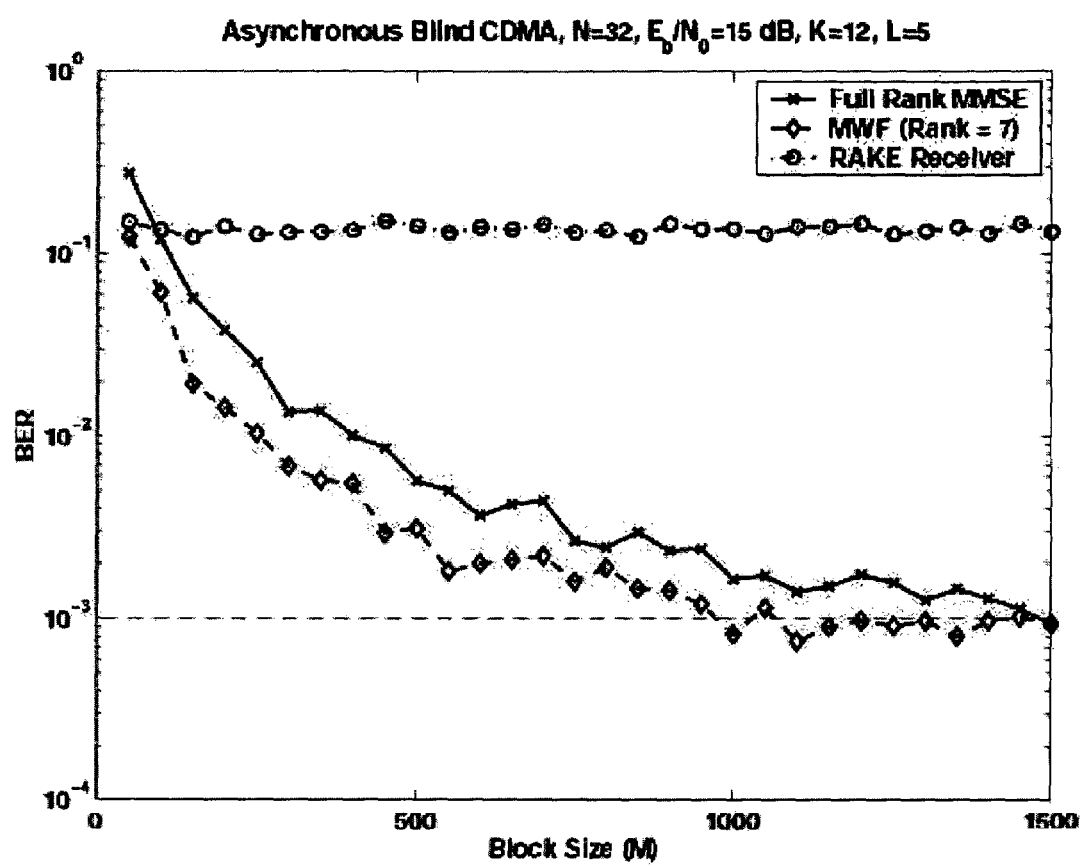

In FIG. 5, a curve showing the number of bits per block versus BER is shown. For this result, the $E_b/N_0$ is 15 dB, K=12, and the rank of the multipath MWF receiver is again seven. Note that the MMSE curve requires about 1500 samples to converge to a BER of about $2 \cdot 10^{-3}$. However, the multipath MWF receiver requires only about 1000 samples per block to converge to the same BER. Thus the multipath MWF receiver can be seen as less sensitive to sample support than the full-rank MMSE. This in turn implies that the multipath MWF receiver can track changes in signals that are varying in time faster than MMSE, which is an advantage of reduced rank processing. In addition, the MMSE solution requires inversion of an N×N covariance matrix, while embodiments of the present invention do not. This illustrates the computational savings that can be obtained by employing the reduced-rank multipath MWF receiver, which yields substantially the same performance as a full rank MMSE receiver. As illustrated in prior figures, the Rake receiver does significantly worse than either the full-rank MMSE receiver or the multipath MWF receiver of the present invention.

In some embodiments, the invention is implemented as a computer program product for adaptive filtering a signal received over a channel subjected to multipath effects. In those embodiments, a computer-readable medium stores at least one program module. The program module determines filter coefficients $\tilde{c}$ such that $$\tilde{c} = E[\tilde{r}\tilde{r}^H]^{-1}\tilde{s}_{desired}, \quad (12)$$

where $$\tilde{c} = E[\tilde{r}\tilde{r}^H]^{-1}\tilde{s}_{desired}, \quad (13)$$

where $\tilde{r}$ is the received signal, $\tilde{s}_{desired}$ is the modified steering vector of the desired signal, and $$\tilde{s}_{desired} = \tilde{s}_{desired} * \tilde{h},$$

where $$\tilde{h} = [h_1, h_2, \ldots, h_L] \quad (15)$$

is a discrete time estimate of the effect of multipath on the channel and L is the delay spread of the channel for the estimate. In some embodiments, the steering vector of the desired signal is the spreading sequence of the desired signal in a code division multiple access communication system.

In further embodiments, a computer program product for adaptive filtering a signal in accordance with the present invention includes a computer-readable medium storing a program module that determines filter coefficients $\tilde{c}$, such that $$\tilde{c} = E[\tilde{r}\tilde{r}^H]^{-1}\tilde{s}_{desired}, \quad (16)$$

where $\tilde{r}$ is the received signal, $\tilde{s}_{desired}$ is the modified steering vector of the desired signal, and $$\tilde{s}_{desired} = \tilde{s}_{desired} * \tilde{h}, \quad (17)$$

where $$\tilde{h} = [h_1, h_2, \ldots, h_L] \quad (15)$$

is a discrete time estimate of the effect of multipath on the channel and L is the delay spread of the channel for the estimate. In these embodiments, the steering vector of the desired signal is the spreading sequence of the desired signal in a code division multiple access communication system.

Computer program products of the present invention include a computer-readable medium storing at least one program module that modifies the steering vector. The modified steering vector is formed by the convolution of the steering vector with a vector estimating the effect of multipath on the observed signal. In a first analysis stage each data vector is projected onto the steering vector to form a set of inner products that estimate the part of the data that best corresponds to the steering vector. The inner products are multiplies onto the steering vector to form a set of vector estLrnates of that part of the data that best corresponds to the steering vector. These vector estimates are subtracted from the corresponding data vectors to obtain a projection of the data onto the nullspace of the steering vector.

In at least one adaptive analysis stage a correlation direction vector of the current adaptive stage is calculated between the corresponding inner products and vector differences of an immediately prior analysis stage. Inner products of the current stage are formed by projecting each vector difference of the immediately prior analysis stage onto the correlation direction vector of the current stage; scaled vectors of the current stage are formed by multiplying the inner products of the current stage onto the correlation direction vector of the current stage. The prior stage vector differences arc projected onto the nulispace of the correlation direction vector of the current stage by subtracting each scaled vector of the current stage from the corresponding projection of the prior stage. The steering vector, in some of these embodiments, is the spreading code of a code division multiple access (CDMA) system.

The invention claimed is:

1. A method for adaptive filtering a signal received over a channel subjected to multipath effects, the method comprising:

determining filter coefficients $\tilde{c}$ such that $$\hat{c} = E[\hat{r}\hat{r}^H]^{-1}\hat{s}_{desired},$$

where

E is the expected value operator, $\tilde{r}$ is the received signal, $\tilde{s}_{desired}$ desired is the modified steering vector of the desired signal, and $\tilde{s}_{desired} = \tilde{s}_{desired} * \tilde{h}$, where $\tilde{h} = [h_1, h_2, \ldots, h_L]$ is a discrete time estimate of the effect of multipath on the channel and L is the delay spread of the channel for the estimate.

2. The method of claim 1, wherein the steering vector of the desired signal is the spreading sequence of the desired signal in a code division multiple access communication system.

3. The method of claim 1, wherein the steering vector comprises the spreading code of a code division multiple access (CDMA).

4. A method for adaptively analyzing an observed signal, the signal characterized by a set of data vectors, to estimate that part of the signal that best corresponds to a steering vector, the method comprising:

modifying the steering vector, wherein the modified steering vector is formed by the convolution of the steering vector with a vector estimating the effect of multipath on the observed signal;

in a first analysis stage:

projecting each data vector onto the steering vector to form a set of inner products that estimate the part of the data that best corresponds to the steering vector, multiplying the inner products onto the steering vector to form a set of vector estimates of that part of the data that best corresponds to the steering vector, subtracting the vector estimates from the corresponding data vectors to obtain a projection of the data onto the nullspace of the steering vector; and in at least one adaptive analysis stage:

calculating a correlation direction vector of the current adaptive stage between the corresponding inner products and vector differences of an immediately prior analysis stage;

forming inner products of the current stage by projecting each vector difference of the immediately prior analysis stage onto the correlation direction vector of the current stage;

forming scaled vectors of the current stage by multiplying the inner products of the current stage onto the correlation direction vector of the current stage;

forming the projection of the prior stage vector differences onto the nullspace of the correlation direction vector of the current stage by subtracting each scaled vector of the current stage from the corresponding projection of the prior stage.

5. A computer program product for adaptive filtering a signal received over a channel subjected to multipath effects, the computer program product comprising:

a computer-readable medium;

at least one program module stored on the medium, the at least one program module operative to:

determining filter coefficients $\hat{c}$ such that $$\hat{c} = E[\hat{\bar{r}}\hat{\bar{r}}^H]^{-1}\hat{\bar{s}}_{desired},$$

where

E is the expected value operator, $\bar{r}$ is the received signal, $\bar{s}_{desired}$ is the modified steering vector of the desired signal, and $\bar{s}_{desired} = \bar{s}_{desired} * \bar{h}$ where $\bar{h} = [h_1, h_2, \ldots, h_l]$ is a discrete time estimate of the effect of multipath on the channel and L is the delay spread of the channel for the estimate.

6. The computer program product of claim 5, wherein the steering vector of the desired signal is the spreading sequence of the desired signal in a code division multiple access communication system.

7. A computer program product for adaptively analyzing an observed signal, the signal characterized by a set of data vectors, to estimate that part of the signal that best corresponds to a steering vector, the computer program product comprising:

a computer-readable medium;

at least one program module stored on the medium, the at least one program module operative to:

modify the steering vector, wherein the modified steering vector is formed by the convolution of the steering vector with a vector estimating the effect of multipath on the observed signal;

in a first analysis stage:

project each data vector onto the steering vector to form a set of inner products that estimate the part of the data that best corresponds to the steering vector, multiply the inner products onto the steering vector to form a set of vector estimates of that part of the data that best corresponds to the steering vector, subtract the vector estimates from the corresponding data vectors to obtain a projection of the data onto the nullspace of the steering vector; and in at least one adaptive analysis stage:

calculate a correlation direction vector of the current adaptive stage between the corresponding inner products and vector differences of an immediately prior analysis stage;

form inner products of the current stage by projecting each vector difference of the immediately prior analysis stage onto the correlation direction vector of the current stage;

form scaled vectors of the current stage by multiplying the inner products of the current stage onto the correlation direction vector of the current stage;

form the projection of the prior stage vector differences onto the nullspace of the correlation direction vector of the current stage by subtracting each scaled vector of the current stage from the corresponding projection of the prior stage.

8. The computer program product of claim 7 wherein the steering vector comprises the spreading code of a code division multiple access (CDMA) system.

9. A method for adaptive filtering in a Multistage Wiener Filter (MWF) of a signal received over a channel subjected to multipath effects, the method comprising:

determining filter coefficients $\hat{c}$ such that $\hat{c} = E[\bar{r}\bar{r}^H]^{-1}\bar{s}_{desired}$, where E is the expected value operator, $\bar{r}$ is the received signal, $\bar{s}_{desired}$ is the modified steering vector of the desired signal, and $\bar{s}_{desired} = \bar{s}_{desired} * \bar{h}$, where $\bar{h} = [h_1, h_2, \ldots, h_l]$ is a discrete time estimate of the effect of multipath on the channel and L is the delay spread of the channel for the estimate.

10. The method of claim 9, wherein the steering vector of the desired signal is the spreading sequence of the desired signal in a code division multiple access communication system.

11. The method for adaptively analyzing an observed signal, the signal characterized by a set of data vectors, to estimate that part of the signal that best corresponds to a steering vector, the method comprising:

modifying the steering vector, wherein the modified steering vector is formed by the convolution of the steering vector with a vector estimating the effect of multipath on the observed signal;

in a first analysis stage:

projecting each data vector onto the steering vector to form a set of inner products that estimate the part of the data that best corresponds to the steering vector, multiplying the inner products onto the steering vector to form a set of vector estimates of that part of the data that best corresponds to the steering vector, subtracting the vector estimates from the corresponding data vectors to obtain a projection of the data onto the nullspace of the steering vector; and in at least one adaptive analysis stage:

calculating a correlation direction vector of the current adaptive stage between the corresponding inner products and vector differences of an immediately prior analysis stage;

forming inner products of the current stage by projecting each vector difference of the immediately prior analysis stage onto the correlation direction vector of the current stage;

forming scaled vectors of the current stage by multiplying the inner products of the current stage onto the correlation direction vector of the current stage;

forming the projection of the prior stage vector differences onto the nulispace of the correlation direction vector of the current stage by subtracting each scaled vector of the current stage from the corresponding projection of the prior stage.

12. The method of claim 11 wherein the steering vector comprises the spreading code of a code division multiple access (CDMA) system.

* * * * *

UNITED STATES PATENT AND TRADEMARK OFFICE
CERTIFICATE OF CORRECTION

PATENT NO. : 7,415,065 B2
APPLICATION NO. : 10/689765
DATED : August 19, 2008
INVENTOR(S) : Seema Sud et al.

It is certified that error appears in the above-identified patent and that said Letters Patent is hereby corrected as shown below:

IN THE CLAIMS:

In Column 8, please replace Claim 1 with:

1. A method for adaptive filtering a signal received over a channel subjected to multipath effects, the method comprising:

determining filter coefficients $\hat{\bar{c}}$, such that $\hat{\bar{c}} = E[\hat{\bar{r}}\hat{\bar{r}}^H]^{-1}\hat{\bar{s}}_{desired}$, where $E$ is the expected value operator, $\hat{\bar{r}}$ is the received signal, $\hat{\bar{s}}_{desired}$ is the modified steering vector of the desired signal, and $\hat{\bar{s}}_{desired} = \bar{s}_{desired} * \bar{h}$, where $\bar{h} = [h_1, h_2, ..., h_L]$ is a discrete time estimate of the effect of multipath on the channel and $L$ is the delay spread of the channel for the estimate.

In Column 9, please replace Claim 5 with:

5. A computer program product for adaptive filtering a signal received over a channel subjected to multipath effects, the computer program product comprising:
  a computer-readable medium;
  at least one program module stored on the medium, the at least one program module operative to:
  determining filter coefficients $\hat{\bar{c}}$, such that $\hat{\bar{c}} = E[\hat{\bar{r}}\hat{\bar{r}}^H]^{-1}\hat{\bar{s}}_{desired}$, where $E$ is the expected value operator, $\hat{\bar{r}}$ is the received signal, $\hat{\bar{s}}_{desired}$ is the modified steering vector of the desired signal, and $\hat{\bar{s}}_{desired} = \bar{s}_{desired} * \bar{h}$, where $\bar{h} = [h_1, h_2, ..., h_L]$ is a discrete time estimate of the effect of multipath on the channel and $L$ is the delay spread of the channel for the estimate.

UNITED STATES PATENT AND TRADEMARK OFFICE
CERTIFICATE OF CORRECTION

PATENT NO. : 7,415,065 B2
APPLICATION NO. : 10/689765
DATED : August 19, 2008
INVENTOR(S) : Seema Sud et al.

It is certified that error appears in the above-identified patent and that said Letters Patent is hereby corrected as shown below:

IN THE CLAIMS (CONT'D.):

In Column 10, Line 22, please change "onto the nulispace of the correlation direction vector of" to -- onto the nullspace of the correlation direction vector of --

In Column 10, please replace Claim 9 with:

9. A method for adaptive filtering in a Multistage Wiener Filter (MWF) of a signal received over a channel subjected to multipath effects, the method comprising:

determining filter coefficients $\hat{\underline{c}}$, such that $\hat{\underline{c}} = E[\hat{\underline{r}}\hat{\underline{r}}^H]^{-1} \hat{\underline{s}}_{desired}$, where $E$ is the expected value operator, $\hat{\underline{r}}$ is the received signal, $\hat{\underline{s}}_{desired}$ is the modified steering vector of the desired signal, and $\hat{\underline{s}}_{desired} \overline{s} = {}^*\overline{h}\cdot{}_{desired}$ where $\overline{h} = [h_1, h_2,..., h_L]$ is a discrete time estimate of the effect of multipath on the channel and $L$ is the delay spread of the channel for the estimate.

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,415,065 B2
APPLICATION NO. : 10/689765
DATED : August 19, 2008
INVENTOR(S) : Seema Sud et al.

It is certified that error appears in the above-identified patent and that said Letters Patent is hereby corrected as shown below:

IN THE CLAIMS:

In Column 8, lines 34-51, please replace Claim 1 with:

1. A method for adaptive filtering a signal received over a channel subjected to multipath effects, the method comprising:

determining filter coefficients $\hat{\bar{c}}$ such that $\hat{\bar{c}} = E[\hat{\bar{r}}\hat{\bar{r}}^H]^{-1}\hat{\bar{s}}_{desired}$, where $E$ is the expected value operator, $\hat{\bar{r}}$ is the received signal, $\hat{\bar{s}}_{desired}$ is the modified steering vector of the desired signal, and $\hat{\bar{s}}_{desired} = \bar{s}_{desired} * \bar{h}$, where $\bar{h} = [h_1, h_2, ..., h_L]$ is a discrete time estimate of the effect of multipath on the channel and $L$ is the delay spread of the channel for the estimate.

In Column 9, lines 28-49, please replace Claim 5 with:

5. A computer program product for adaptive filtering a signal received over a channel subjected to multipath effects, the computer program product comprising:
   a computer-readable medium;
   at least one program module stored on the medium, the at least one program module operative to:
   determining filter coefficients $\hat{\bar{c}}$ such that $\hat{\bar{c}} = E[\hat{\bar{r}}\hat{\bar{r}}^H]^{-1}\hat{\bar{s}}_{desired}$, where $E$ is the expected value operator, $\hat{\bar{r}}$ is the received signal, $\hat{\bar{s}}_{desired}$ is the modified steering vector of the desired signal, and $\hat{\bar{s}}_{desired} = \bar{s}_{desired} * \bar{h}$, where $\bar{h} = [h_1, h_2, ..., h_L]$ is a discrete time estimate of the effect of multipath on the channel and $L$ is the delay spread of the channel for the estimate.

UNITED STATES PATENT AND TRADEMARK OFFICE
CERTIFICATE OF CORRECTION

PATENT NO. : 7,415,065 B2
APPLICATION NO. : 10/689765
DATED : August 19, 2008
INVENTOR(S) : Seema Sud et al.

It is certified that error appears in the above-identified patent and that said Letters Patent is hereby corrected as shown below:

IN THE CLAIMS (CONT'D.):

In Column 10, Line 22, please change "onto the nulispace of the correlation direction vector of" to -- onto the nullspace of the correlation direction vector of --

In Column 10, lines 30-43, please replace Claim 9 with:

9. A method for adaptive filtering in a Multistage Wiener Filter (MWF) of a signal received over a channel subjected to multipath effects, the method comprising:

determining filter coefficients $\hat{\bar{c}}$, such that $\hat{\bar{c}} = E[\hat{\bar{r}}\hat{\bar{r}}^H]^{-1}\tilde{\bar{s}}_{desired}$, where $E$ is the expected value operator, $\hat{\bar{r}}$ is the received signal, $\hat{\bar{s}}_{desired}$ is the modified steering vector of the desired signal, and $\hat{\bar{s}}_{desired} \; \bar{s} = {}^*\bar{h} \cdot {}_{desired}$ where $\bar{h} = [h_1, h_{2,...,} h_L]$ is a discrete time estimate of the effect of multipath on the channel and $L$ is the delay spread of the channel for the estimate.

This certificate supersedes the Certificate of Correction issued June 9, 2009.

Signed and Sealed this

Seventh Day of July, 2009

JOHN DOLL
*Acting Director of the United States Patent and Trademark Office*